United States Patent
Edgar et al.

(10) Patent No.: US 11,893,268 B2
(45) Date of Patent: Feb. 6, 2024

(54) OPPORTUNISTIC COMMAND SCHEDULING

(71) Applicant: Seagate Technology LLC, Fremont, CA (US)

(72) Inventors: Brian T. Edgar, Minneapolis, MN (US); Mark A. Gaertner, Vadnais Heights, MN (US)

(73) Assignee: Seagate Technology LLC, Fremont, CA (US)

( * ) Notice: Subject to any disclaimer, the term of this patent is extended or adjusted under 35 U.S.C. 154(b) by 106 days.

(21) Appl. No.: 17/579,061

(22) Filed: Jan. 19, 2022

(65) Prior Publication Data
US 2023/0229343 A1 Jul. 20, 2023

(51) Int. Cl.
*G06F 3/06* (2006.01)

(52) U.S. Cl.
CPC .......... *G06F 3/0655* (2013.01); *G06F 3/0604* (2013.01); *G06F 3/0676* (2013.01)

(58) Field of Classification Search
CPC ... G06F 3/0655; G06F 3/0604; G06F 3/06076
See application file for complete search history.

(56) References Cited

U.S. PATENT DOCUMENTS

| | | | |
|---|---|---|---|
| 5,991,825 A * | 11/1999 | Ng | G06F 3/0674 710/39 |
| 6,018,790 A | 1/2000 | Itoh et al. | |
| 6,934,818 B2 | 8/2005 | Okada | |
| 7,277,984 B2 | 10/2007 | Ghosal et al. | |
| 7,376,334 B2 | 5/2008 | Sugimoto | |
| 7,774,540 B2 | 8/2010 | Han et al. | |
| 8,051,232 B2 | 11/2011 | Dees et al. | |
| 8,112,566 B2 | 2/2012 | Chang | |
| 8,327,093 B2 | 12/2012 | Olds et al. | |
| 10,228,880 B2 | 3/2019 | Berman et al. | |
| 10,249,339 B1 | 4/2019 | Mendonsa et al. | |
| 10,346,094 B2 | 7/2019 | Xiao et al. | |
| 2003/0084261 A1 | 5/2003 | Byrd et al. | |
| 2008/0005398 A1 | 1/2008 | Huffman | |
| 2008/0320241 A1 | 12/2008 | Dees et al. | |
| 2009/0100433 A1 | 4/2009 | Kang et al. | |
| 2010/0011149 A1 | 1/2010 | Molaro et al. | |
| 2011/0153870 A1 | 6/2011 | Marks | |
| 2019/0279660 A1* | 9/2019 | Ehrlich | G11B 5/012 |

FOREIGN PATENT DOCUMENTS

CN 101118477 A 2/2008

* cited by examiner

*Primary Examiner* — Gurtej Bansal
(74) *Attorney, Agent, or Firm* — Westman, Champlin & Koehler, P.A.

(57) ABSTRACT

A method includes calculating, by a data storage device processor, at least one access trajectory from a first disc surface location to at least one second disc surface location at which at least one primary data access operation is to be carried out. The method also includes determining, by the data storage device controller, whether an opportunity to commence at least one secondary data access operation exists along or proximate to the at least one access trajectory from the first disc surface location to the at least one second disc surface location.

20 Claims, 5 Drawing Sheets

OPPORTUNISTIC COMMAND SCHEDULING

SUMMARY

In one embodiment, a method includes calculating, by a data storage device processor, at least one access trajectory from a first disc surface location to at least one second disc surface location at which at least one primary data access operation is to be carried out. The method also includes determining, by the data storage device processor, whether an opportunity to commence at least one secondary data access operation exists along or proximate to the at least one access trajectory from the first disc surface location to the at least one second disc surface location.

In another embodiment, a data storage device includes a data storage medium having at least one data storage surface, at least one head configured to interact with the at least one data storage surface to perform data access operations, and a processor communicatively coupled to the at least one head. The processor is configured to compute at least one access trajectory for the at least one head from a first location of the at least one data storage surface to at least one second location of the at least one data storage surface at which at least one primary data access operation is to be carried out by the at least one head. The processor is also configured to determine whether an opportunity for the at least one head to commence at least one secondary data access operation exists along or proximate to the at least one access trajectory from the first disc surface location to the at least one second disc surface location.

In yet another embodiment, a method includes classifying, by a processor of a data storage device, data access operations to be carried out in the data storage device into primary data access operations and secondary data operations based on one or more data operation characteristics. The method also includes calculating, by the processor, at least one access trajectory from a first disc surface location to at least one second disc surface location at which at least one primary data access operation of the primary data access operations is to be carried out. The method further includes determining, by the processor, whether an opportunity to commence at least one secondary data access operation of the secondary data access operations exists along or proximate to the at least one access trajectory from the first disc surface location to the at least one second disc surface location.

This summary is not intended to describe each disclosed embodiment or every implementation of opportunistic command scheduling as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to enabling the performance of one or more secondary data access operations (e.g., write operations that are part of an in-device data transfer) that are along or proximate to an access trajectory to a primary data access operation (e.g., a read operation to satisfy a read command from a host). Prior to providing details regarding the different embodiments, a description of an illustrative operating environment is provided below.

Figure 1A:
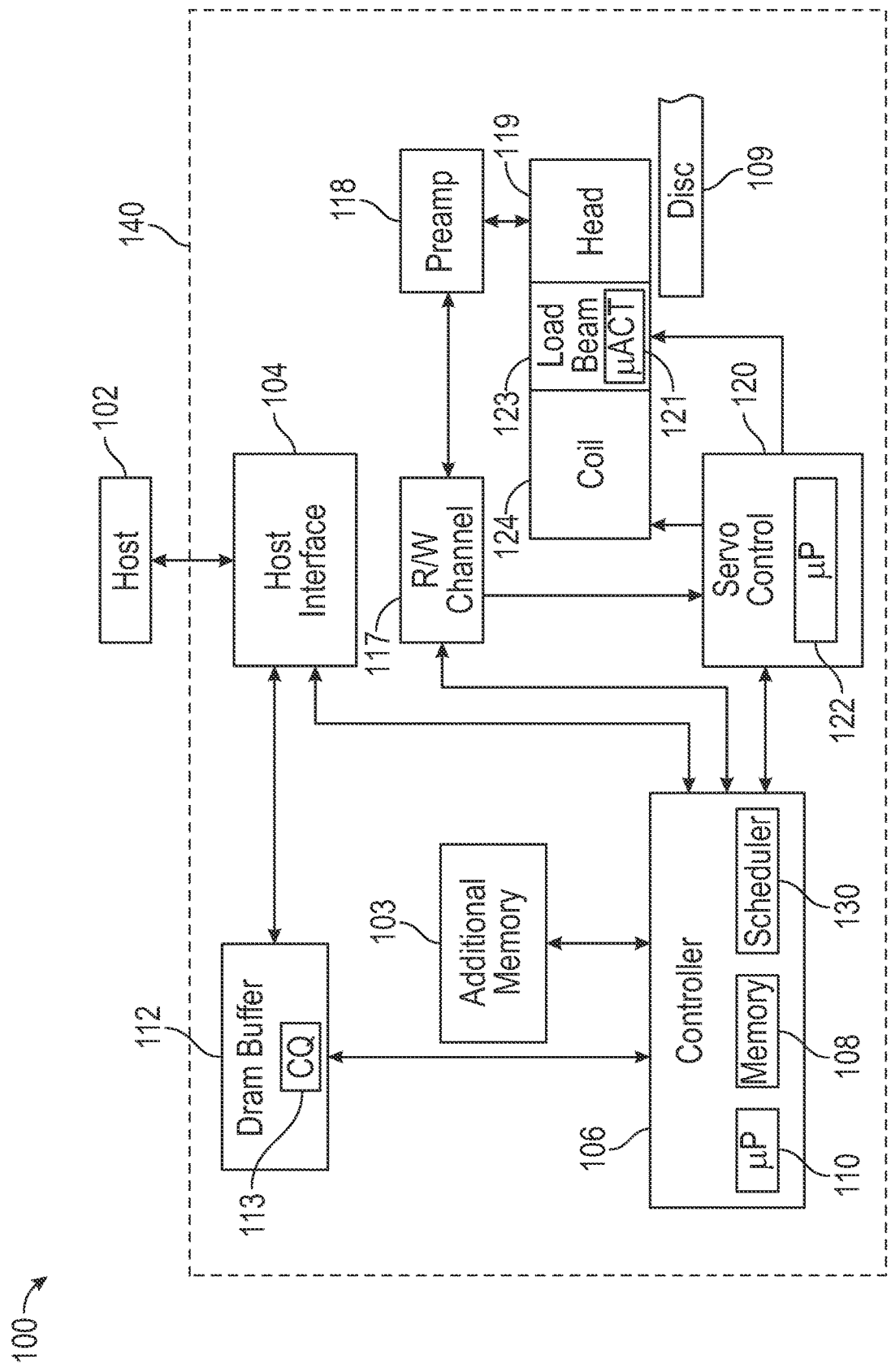
FIG. 1A is a diagrammatic illustration of a system in which opportunistic command scheduling in accordance with certain embodiments of the disclosure may be carried out.

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that like reference numerals may be used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1A is a diagrammatic illustration of a system in which data access operations in accordance with certain embodiments of the present disclosure may be carried out. Specifically, FIG. 1 provides a simplified block diagram of a data storage device (DSD) 100. The DSD 100 may be coupled to a host 102 and may service commands from the host 102. The host 102 may also be referred to as the host system, host device or host computer. The host 102 can be a desktop computer, a laptop computer, a server, a tablet computer, a telephone, a music player, another electronic device, or any combination thereof. The DSD 100 can communicate with the host device 102 via a hardware or firmware-based interface 104. The interface 104 may comprise any interface that allows communication between a host 102 and a DSD 100, either wired or wireless, such as USB, IEEE 1394, Compact Flash, SATA, eSATA, PATA, SCSI, SAS, PCIe, NVMe, Fibre Channel, Ethernet, or Thunderbolt, among others. The interface 104 may include a connector (not shown) that allows the DSD 100 to be physically removed from the host 102. In some embodiments, the DSD 100 may have a casing 140 housing the components of the DSD 100, or the components of the DSD 100 may be attached to the housing 140, or a combination thereof.

DSD 100 can include a buffer (e.g., a DRAM buffer) 112 and a programmable controller 106. Buffer 112 can temporarily store data during read and write operations, and can include a command queue (CQ) 113 where multiple pending operations can be temporarily stored pending execution. Commands arriving over the interface 104 may automatically be received in the CQ 113 or may be stored there by controller 106, interface 104, or another component.

Programmable controller 106 can include associated memory 108 and processor 110. In some embodiments, the DSD 100 can include a read-write (R/W) channel 117, which can encode data during write operations and reconstruct user data retrieved from a memory, such as disc(s) 109, during read operations. A preamplifier circuit (preamp) 118 can apply write currents to one or more heads 119 and provides pre-amplification of read-back signals. A servo control circuit 120 may use servo data to provide the appropriate current to a coil 124, sometimes called a voice coil motor (VCM), to position the head(s) 119 over a desired area of the disc(s) 109. The controller 106 can communicate with a processor 122 to move the head(s) 119 to the desired locations on the disc(s) 109 during execution of various pending commands in the CQ 113.

In some embodiments, the DSD 100 may include solid state memory in addition to disc memory. For example, the DSD 100 can include an additional memory 103, which can be either volatile memory such as DRAM or SRAM, or nonvolatile memory, such as NAND Flash memory. The additional memory 103 can function as a cache and store recently or frequently read or written data, or data likely to be read soon. Additional memory 103 may also function as main storage in addition to disc(s) 109. A DSD 100 containing multiple types of nonvolatile storage media, such as a disc(s) 109 and Flash memory 103, may be referred to as a hybrid storage device.

To read or write data to a storage medium such as disc(s) 109, DSD 100 may employ servo data to properly position head 119 over a desired track. Servo data used to identify a head's location over a disc may be recorded onto disc(s) 109, interspersed between user data. Servo data may be read from disc(s) 109 by head 119 as the disc(s) 109 spin and the head 119 position is adjusted. The read servo data may be provided to preamp circuit 118. The preamp circuit 118 may preamplify and filter the readback signals from the transducer head 119, and provide the processed servo data to read/write channel 117. The R/W channel 117 can detect and condition the servo data, including application of automatic gain control and conversion of the signals to digital form.

Servo control 120 can process the digitized servo data to generate a current command signal. The command signal may be used to apply the appropriate current to the coil 124 to position the transducer 119 over the disc(s) 109. The servo data may be used to determine a current track location of the head 119, and calculate adjustments to move to a target track, which may be called track seeking. Once the head 119 is over a desired track, the servo data may be used to maintain the head's position over the track during read or write operations, which may be called track following.

In certain embodiments, to attain fine position control of the head 119 relative to a selected data track, a head stack assembly (HSA) can include one or more micro-actuators (μACT) 121 (which may also be referred to as secondary or tertiary actuator motors) supported by a load arm 123. The micro-actuator 121 can include a bipolar piezoelectric transducer that responds to positive voltage inputs by expanding in a predetermined direction, while contracting in the predetermined direction to application of a negative voltage. As the micro-actuator 121 can be affixed to a load arm of a HSA, changes in mechanical position of the micro-actuator relative to the selected data track results in changes in mechanical position of the head 119 relative to the selected data track of the disc 109, thereby facilitating fine position control of the head 119 relative to the selected data track. Structures (such as 121, 123 and 124) for supporting and moving the head 119 are collectively referred to herein as an actuator. Although a single actuator is shown in FIG. 1A, multiple actuators supporting different heads 119 that communicate with one or more data storage surfaces may be employed.

In DSD 100, write commands from host 102 may be satisfied by initially writing the data associated with the commands in a cache (e.g., in a portion of DRAM 112, in additional memory 103 and/or in a media cache on disc 109), and indicating to the host 102 that the commands are completed when the data is still in the write cache. Sometime later, the data from the write cache is transferred to main storage locations on disc 109. However, host 102 read commands may be pending until the data is retrieved from the main storage locations (e.g., locations on disc 109) and returned to the host 102. A command scheduler (sometimes referred to herein as simply a scheduler) 130 may order the host 102 read commands to be carried out according to one or more predetermined criteria (e.g., time of arrival in DSD 100, command age, etc.). The scheduler 130 may be a processor, controller, or other circuit, or it may be a set of software instructions that, when executed by a processing device, perform the command scheduling functions. In some embodiments, the scheduler 130 may be part of or executed by controller 106. In general, command scheduling and control functions in accordance with embodiments of the disclosure may be performed by any suitable processor in DSD 100. Also, in general, to manage scheduling of read, write, read verification and other operations that may be background, cached, reliability-related or host-outstanding operations, scheduler 130 may consider several command-related criteria such as access time, power/energy, age/priority, cache saturation level, disc operation type, etc.

Additionally, for opportunistic command scheduling, scheduler 130 may treat some commands or operations as "primary data access operations" and other commands or operations as "secondary data access operations." Opportunistic command scheduling is described in detail below.

As indicated earlier, embodiments of the disclosure enable the performance of one or more secondary data access operations that are along or proximate to an access trajectory to a primary data access operation. Accordingly, scheduler 130 may also be configured to determine whether, "on the way" to a location on a disc surface (e.g., a surface of disc 109) to execute a primary data access operation, there may be an opportunity to carry out one or more secondary data access operations at locations that are along (or proximate to) an access trajectory to the location of the primary data access operation without incurring a substantial performance penalty. The one or more secondary data access operations on the way to the primary data access operation are essentially "free" secondary data access operations since there may be no performance penalty for the primary data access operation. It should be noted that the access trajectory may take into consideration both a seek trajectory from a current head 119 position to a track on which data associated with the primary data access operation is located and a rotational position on the track of data associated with the primary data access operation. One example in which a read is made a primary data access operation and a write is made a secondary data access operation is described below in connection with FIG. 1B and 1C.

Figure 1B:
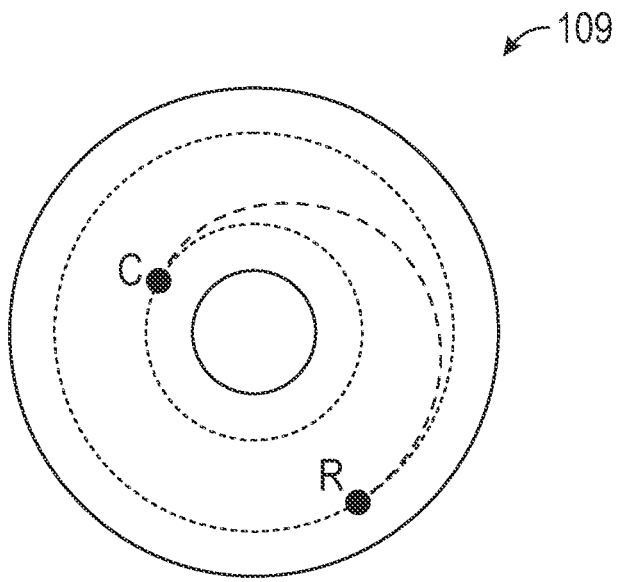
FIGS. 1B and 1C are diagrammatic illustrations that together show a write on the way to a read on a surface of a disc in accordance with an embodiment of the disclosure.
Figure 1C:
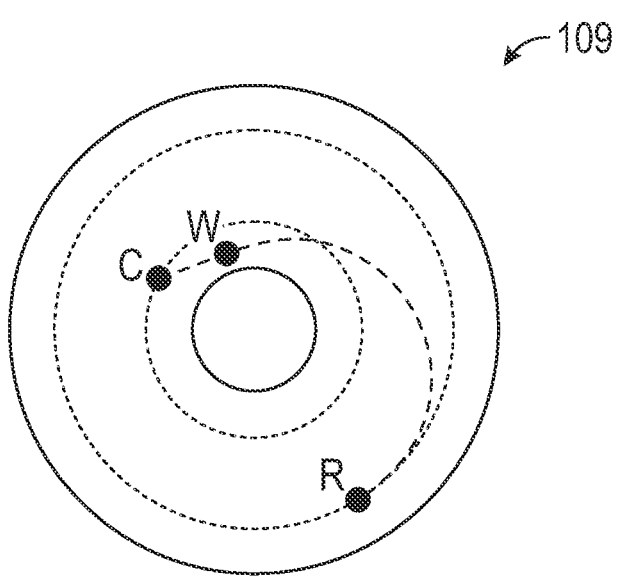

FIGS. 1B and 1C illustrate a write on the way to a read on a surface of disc 109. In FIGS. 1B and 1C, C is a current head position, R is a location for a read operation selected by the scheduler 130 to be carried out, and W (shown in FIG. 1C) is a write on the way (e.g., along or proximate to the access trajectory) to the read R, which can be performed before getting to the read R. One or more write commands such as W that may be on the way to the read R may be found by carrying out one or more rotational position scheduling/sorting (RPS) searches. It should be noted that that the selection of the write command(s) may not be based solely on RPS searches, and, in some embodiments, may be based on a mix of considerations. In the interest of brevity, details regarding how RPS searches are carried out are not provided. A forward RPS search for candidate writes may be carried out starting from C. Here, a search for candidate writes in the write cache moving forward in time from the current head position C is carried out. Additionally, or alternatively, a reverse RPS search for candidate writes in the write cache moving backwards in time from a predetermined target time to reach R may be carried out. A write (e.g., write W) in the write cache may qualify as a candidate if a calculated time to move the head from its current position C to the write plus the time to move the head from the write to the read R is equal or substantially equal (due to the probabilistic nature of access time estimates) to the calculated access time from C to R.

In the examples of FIGS. 1B and 1C, the scheduler 130 of FIG. 1A determines a single write W to be performed on the way to the read R. However, the scheduler 130 may determine that multiple writes can be performed on the way to the read R. Further, scheduler 130 may select read R after examining multiple access trajectories for multiple reads and determining whether candidate writes exist along or proximate to the access trajectories for one or more of those multiple reads. Then, scheduler 130 may select R from the multiple reads based on one or more predetermined criteria (e.g., seek power usage, closeness in command completion deadlines, number of writes on the way, power consumed by writes on the way, etc.) In certain embodiments, scheduler 130 may be configured to choose a less-than-optimal R (e.g., a non-first-ranked or non-first-choice R) if such a choice allows a write to be accessed on the way to the less-than-optimal R when no "free" write can be accessed on the way to the best choice for R. Further, when there are multiple individually acceptable "free" or "low cost" writes, scheduler 130 may choose from the acceptable writes so as to benefit another metric (e.g., power, age, cache consumption, etc.). As indicated earlier, performing a secondary data access operation (e.g., write) on the way to the primary data access operation (e.g., read) is "free" when there is no performance penalty for the primary data access operation. Accordingly, a "low cost" secondary data access operation may result in some performance penalty (e.g., a predetermined performance penalty) for the primary data access operation.

It should be noted that the primary and secondary data access operations may sometimes utilize different heads. In general, there can be multiple secondary data access operations under consideration for the same access trajectory, or different secondary data access operations (or sets of secondary data access operations) for different trajectories to different primary data access operations. Although access trajectories in FIGS. 1B and 1C are shown as dashed lines indicative of paths, access trajectories may be access times that are independent of direction. Accordingly, a secondary data access operation may be considered to be along or proximate to an access trajectory to a primary data access operation if a calculated time to move the head from its current position to a location of the secondary data operation, plus the time to move the head from the location of the secondary data access operation to a location of the primary data access operation, is equal or substantially equal to the calculated access time from the head's current position to the location of the primary data access operation. This may be independent of the direction of movement of the head.

At different times during the operation of a DSD such as 100 (of FIG. 1A), the primary data access operation(s) may have no deadline(s) or no soon-approaching deadline(s), or may have long access times that may involve multiple disc revolutions. Under such conditions, access times from the current head position to different locations of different secondary data access operations may be determined to obtain a distribution of access times. Here, a decision whether it is opportune to perform one or more of the secondary data access operations is made in the context of a current workload. Seeking to the secondary data assess operation is opportune if it is at a low end of the distribution of access times.

In FIGS. 1B and 1C and their description above, the read operation is considered to be a primary data access operation and the write operation is considered to be a secondary data access operation to be performed on the way to the primary operation. It should be noted that read operations need not always be primary data access operations, and write operations need not always be secondary data access operations. In some embodiments, high priority data access operations (e.g., data access operations that have fast-approaching execution/completion deadlines) may be considered to be primary data access operations independently of their operation type (e.g., write or read), and low priority data access operations (e.g., data access operations that do not have fast-approaching execution/completion deadlines) may be considered to be secondary data access operations independently of their operation type. Also, in some cases, neither primary nor secondary data access operations may be host pending operations. In other words, both primary and secondary data access operations may be in-drive operations. In certain cases, both primary and secondary data access operations may be host pending. In different embodiments, data access operations may be pooled into, or classified as, primary and secondary data access operations using any suitable distinguishing criteria. In certain embodiments, a primary data access operation may be delayed in order to fit in a secondary data access operation on the way to the primary data access operation.

In addition to being applicable to conventional magnetic recording (CMR), embodiments of the disclosure may also be useful with other recording techniques (e.g., shingled magnetic recording (SMR)). Large writes may be predominant in SMR workloads, but may generally take place in any hard disc drives (HDDs) or hybrid drives that cache (in volatile or non-volatile caches) large logical block address (LBA) contiguous sets of data. In some SMR embodiments, host data may be first written to one or more media caches on a data storage disc using CMR, and then transferred to zones on the data storage disc using shingled recording to form SMR bands. Such data transfers typically involve large writes. For opportunistic writing on large writes, a large write operation may be commenced on the way to a read, and after a portion of the large write operation is performed, the head may be moved to a location where the read is carried out. Remaining portions of the large write operation may be opportunistically carried out on the way to subsequent reads. Example strategies for opportunistic writing in the case of large writes are provided below in connection with FIGS. 2-6.

Figure 2:
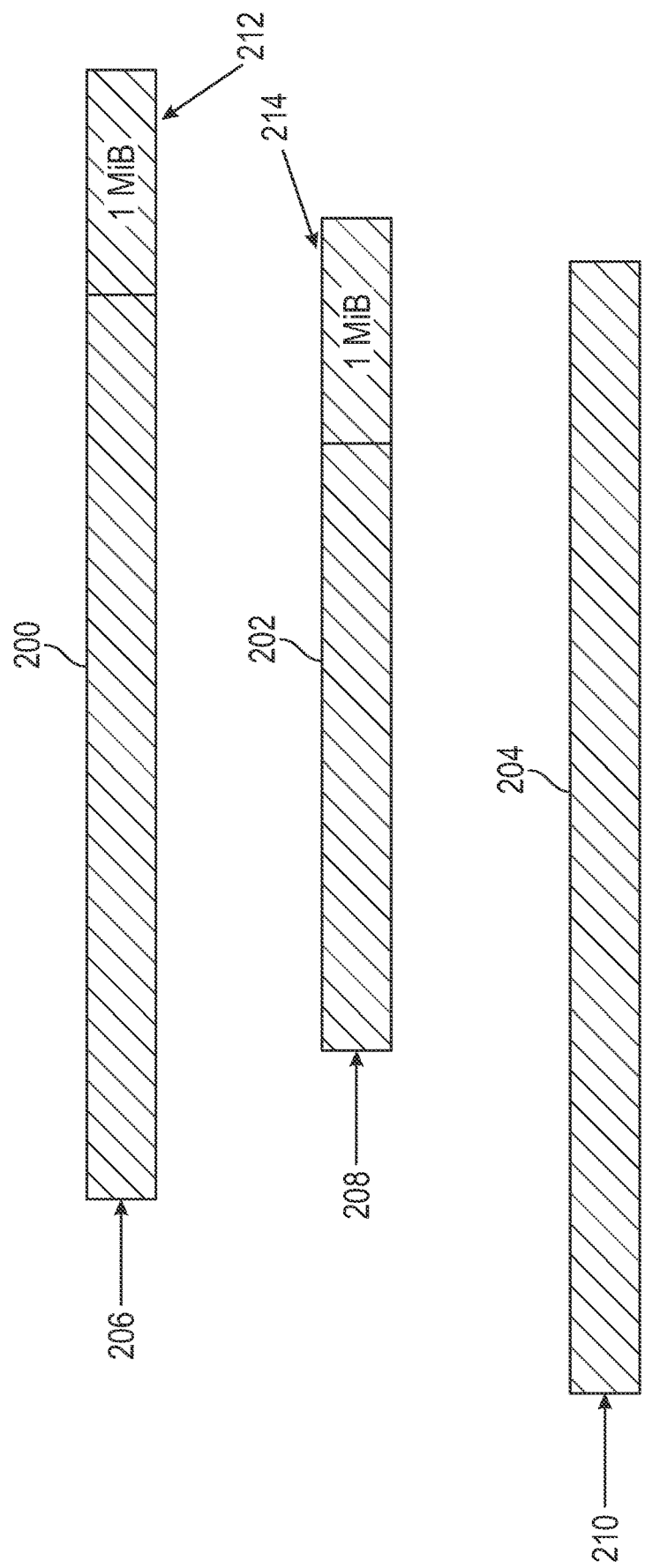
FIG. 2 is a diagrammatic illustration showing sequential writes employed in a data storage device.

FIG. 2 is a diagrammatic illustration showing sequential writes in a data storage device. In FIG. 2, each shaded block 200, 202, 204 represents a write cache portion to be ultimately transferred to tracks on one or more data storage surfaces. Data in each cache portion 200, 202, 204 may be arranged sequentially (e.g., in logical block address (LBA) order), and may be transferred to the track(s) in any suitable order. In some SMR embodiments, in each cache portion 200, 202, 204 may be transferred to a respective SMR band in that sequential order. In FIG.2, left ends 206, 208, and 210 in cache portions 200, 202, and 204, respectively, may correspond to starting points (e.g., lowest LBAs) for the data transfers to the respective SMR bands. It should be noted that CMR is not restricted to moving the lowest LBAs of LBA sets to their respective main storage locations on tracks. New writes are shown at the right ends of cache portions 200 and 202, which, in the Example of FIG. 2, include 1 mebibyte (MiB) of new data written in the cache portion 200, 202. The new writes at write pointers 212 and 214 grow the cached write data to the right in FIG. 2.

In embodiments of the disclosure, initial write locations (e.g., locations on the data storage disc to which lowest LBAs 206, 208 and 210 are to be written) are utilized by a scheduler such as 130 of FIG. 1 to determine which one of cache portions 200, 202 and 204 is most suitable for commencing a data transfer to locations on the data storage disc prior to performing a primary read operation selected by the scheduler. It should be noted that the 3 cache portions 200, 202 and 206 are merely an example, and any suitable number of cache portions, fewer than or more than three, may be available to the scheduler for use in selecting a suitable cache portion for a data transfer prior to performing the read operation. As indicated above, data in each cache portion such as 200, 202 and 204 may be too large to carry out an entire data transfer prior to performing the primary read operation. Also, in such systems, there may not be much benefit in limiting a size of the data transfer such that it is an entirely "free" write on the way to the primary read operation. A greater benefit may be obtained by writing additional revolutions of data (e.g., in addition to the free portion) based on different criteria such as the amount of write data in the cache portion, write cache saturation levels, etc. Also, in some cases, during the secondary write operation, a decision may be made to seek to a different read if, as a result of the additional revolutions for writing, seeking to that different read is more efficient than seeking to the primary read that was the basis for the selection of the secondary write. Read deadlines may also be factored into determining when to stop a secondary write operation, and seek to a read. Reads may have explicit deadlines or their deadlines may be a function of command completion time (CCT) constraints, which are preferably not disrupted. There is typically a CCT distribution to be satisfied. Therefore, different CCT choices may be made for each individual read command of a plurality of read commands, but the choices are made such that, on average, the CCT distribution is satisfied.

FIGS. 3-6 show different strategies for selecting and/or performing secondary write operations in accordance with embodiments of the disclosure. It should be noted that, in FIGS. 3, 4 and 6, both the cache and the data storage disc track that data from the cache is written to are depicted as converged. In other words, in FIGS. 3-6, a same shaded block represents both the cache and the data storage disc track(s) where the cache data is being transferred. This has been done for purposes of simplification because data may be stored sequentially in both the cache and on the data storage disc tack(s) to which the cache data is transferred. Also, for purposes of simplification, in FIGS. 3, 4 and 6, a vertical dimension represents a distance (e.g., in tracks/cylinders), from a track that is currently being written, to different tracks on which read operations to be carried out are located.

Figure 3:
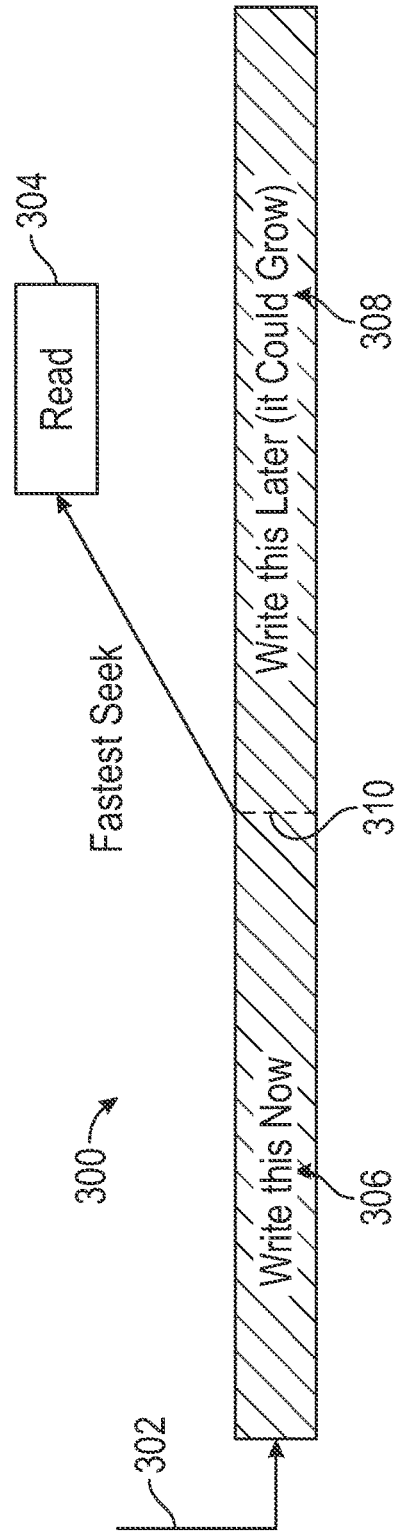
FIG. 3 is a simplified block diagram of a first strategy for carrying out a write before a read in accordance with an embodiment of the disclosure.

FIG. 3 is a simplified block diagram of a first strategy for carrying out a write before a read in accordance with an embodiment of the disclosure. In FIG. 3, block 300 represents both a cache and a data storage disc track that data from the cache is being written on. Accordingly, location 302 represents both the starting point of the cache and an initial sector of the data storage disc track at which a secondary write begins. After the secondary write is selected based on a location of a primary read, and a decision is made as to the minimum amount of data to be written (which is the subject of a strategy described below in connection with FIG. 6), the secondary write is commenced. Thereafter, a next operation (likely a read) 304 is selected. Read 304 may be the primary read that was utilized to select the secondary write, or a different read that is more efficient to seek to than the primary read. In some cases, the different read may have arrived in the DSD after the execution of the secondary write has commenced. Once read 304 is selected, the head actuation system is set up for a faster seek to read 304, and any leftover latency is given to extending the secondary write. In other words, the seek is set up such that the head departs from the secondary write "just in time" to reach the read 304. The data written before departing to the read is denoted by reference numeral 306. It should be noted that the slower the seek, the earlier the head would have to depart to reach the read 304 in time, and therefore a slow seek would result in less data 306 written. Any remaining cache data 308, which can grow as a result of the arrival of new host write commands, may be written sometime after read 304 is completed. The remaining cache data 308 has a new starting point 310. It should be noted that utilizing the faster seek involves higher energy/power, but the overall strategy is designed to reduce minimize the number of disc write operations.

Figure 4:
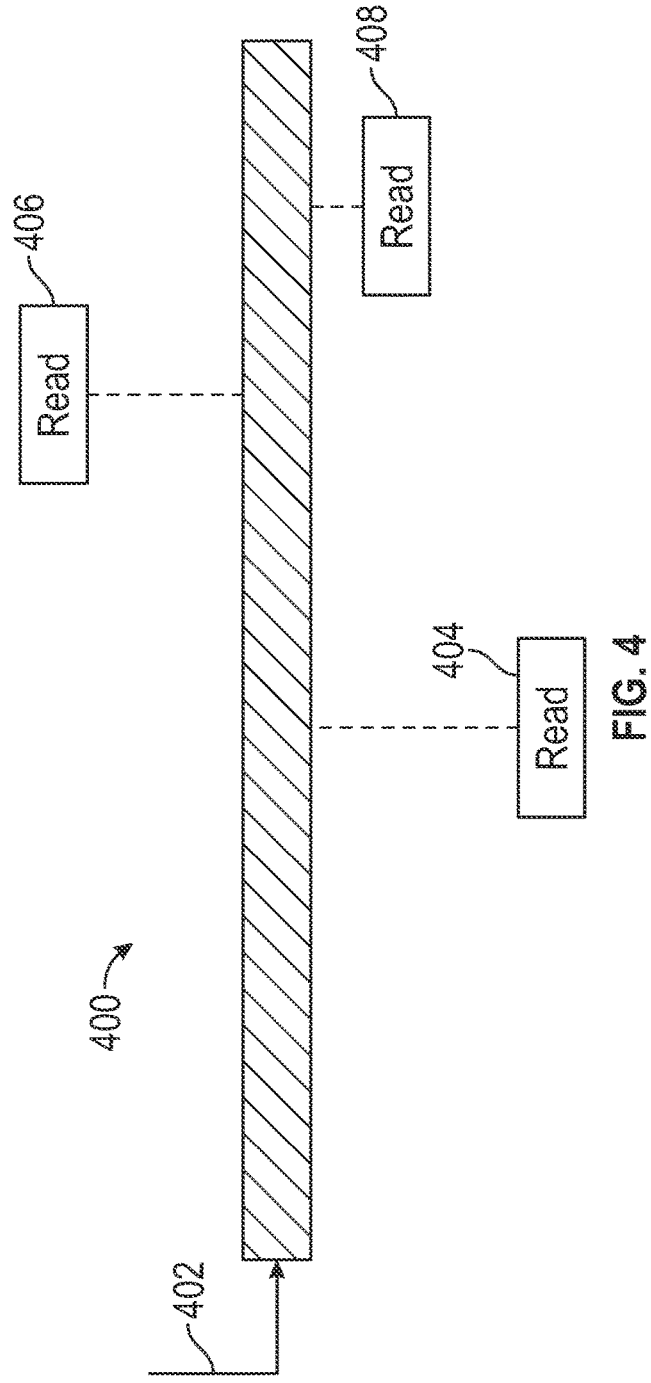
FIG. 4 is a simplified block diagram of a second strategy for carrying out a write before a read in accordance with an embodiment of the disclosure.

FIG. 4 is a simplified block diagram of a second strategy for carrying out a write before a read in accordance with an embodiment of the disclosure. In FIG. 4, block 400 represents both a cache and a data storage disc track that data from the cache is being written on. Accordingly, location 402 represents both the starting point of the cache and an initial sector of the data storage disc track at which a secondary write begins. A vertical dimension in FIG. 4 represents a distance (e.g., in tracks/cylinders), from a track that is currently being written, to different tracks on which read operations to be carried out are located. After the secondary write is selected based on an initial primary read, and then commenced, the strategy shown in FIG. 4 is employed. This strategy involves determining which read of a plurality of pending reads has a shortest seek distance from the track that is being written on. The strategy then involves seeking to that read after giving any latency involved to more writing. In FIG. 4, three reads 404, 406 and 408 are shown. Since the writing on the data storage disc track 400 is commenced at location 402, and progresses from left to right along the data storage disc track 400, reads 404 and 406 are reachable earlier than read 408. However, seeks to reads 404 or 406 from the data storage disc track 400 would be longer (e.g., would involve a greater amount of time than a seek to read 408), since read 408 is a shortest distance from data storage disc track 400. Thus, in the example of FIG. 4, selecting the shortest seek, to read 408, results in more cache data being written on the data storage disc track, and a reduced amount of time seeking.

Figure 5:
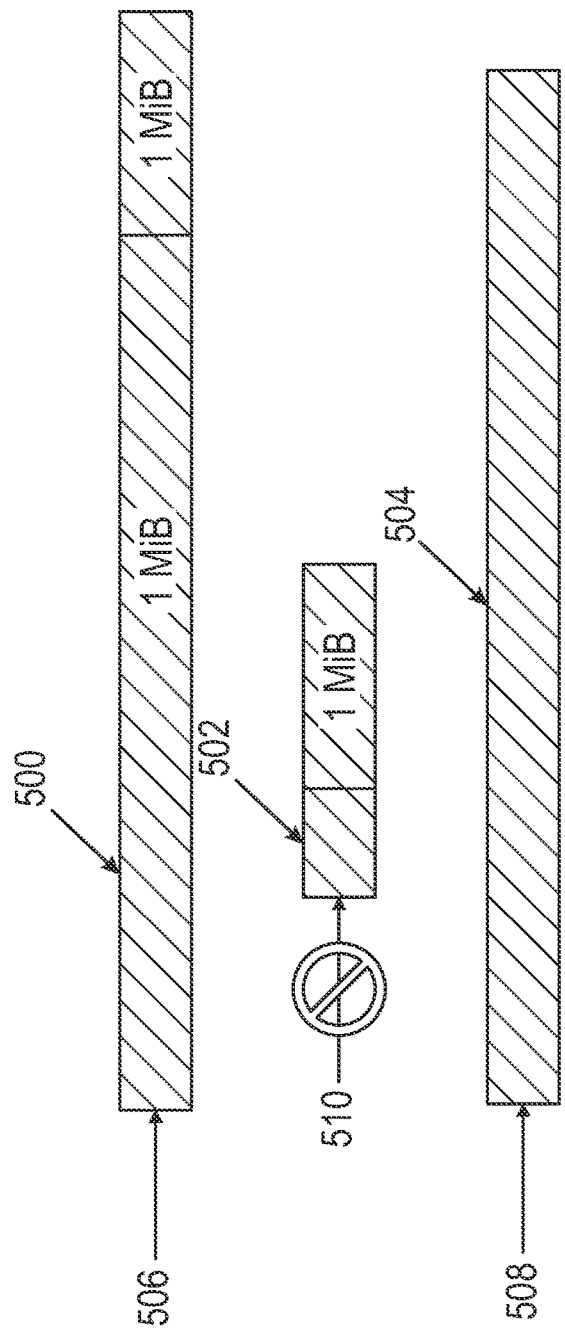
FIG. 5 is a simplified block diagram of a third strategy for carrying out a write before a read in accordance with an embodiment of the disclosure.

FIG. 5 is a simplified block diagram of a third strategy for carrying out a write before a read in accordance with an embodiment of the disclosure. In FIG. 5, three cache portions 500, 502 and 504 having differing amounts of data are included. In the embodiment of FIG. 5, starting locations 506 and 508 of cache portions 500 and 504, respectively, are taken into consideration by a scheduler such as 130 (of FIG. 1) for selection as a secondary write candidate before performing a primary write. However, starting point or location 510 of write cache portion 504 is excluded from the secondary write candidate selection process because the amount/size of the data in cache portion 502 is too small for applying, for example, the latency-related strategy shown in FIG. 4. Having cache portions such as 500 and 504 that have relatively large amounts of data provides flexibility to apply different strategies described herein.

Figure 6:
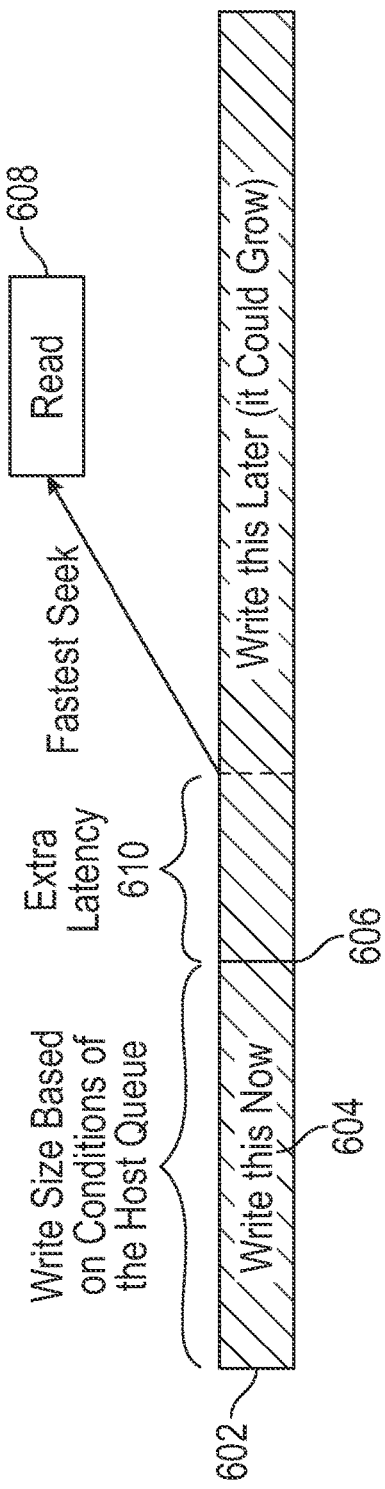
FIG. 6 is a simplified block diagram of a fourth strategy for carrying out a write before a read in accordance with an embodiment of the disclosure.

FIG. 6 is a simplified block diagram of a fourth strategy for carrying out a write before a read in accordance with an embodiment of the disclosure. In FIG. 6, block 600 represents both a cache and a data storage disc track that data from the cache is being written on. Accordingly, location 602 represents both the starting point of the cache and an initial sector of the data storage disc track at which a secondary write begins. After the secondary write is selected based on a location of a primary read, the strategy shown in FIG. 6 involves selecting or calculating an amount of data from the cache 600 to be initially written during the secondary write. The calculation or selection of the initial write size may be based on conditions of individual reads in a pending read queue. For example, if the pending read queue either has no priority reads, or has only young priority reads (e.g., reads that a sufficiently far from their completion deadlines), a relatively large initial write size (e.g., 5 MiB) may be selected. However, if there are one or more pending reads in the queue that are approaching their command completion deadlines, a smaller initial write size (e.g., 2-3 MiB) may be selected. The end point 606 for the selected write size 604 on the data storage disc track 600 serves as a starting point from which a suitable new primary read may be selected. Once the new primary read (e.g., read 608) is selected), and the head actuation system is set up for a faster seek to that operation, any extra latency 610 is given to extending the secondary write.

To avoid accumulating write cache data to an extent that writing becomes urgent (e.g., due to total saturation), the strategy may involve looking for opportune accesses "early." If the pending read queue members reach a CCT limit, the system may switch back to reading after each early write. Accordingly, this strategy may involve alternating between writes and reads.

The strategies for opportunistic command scheduling described above in connection with FIGS. 3-6 consider a read operation to be a primary data access operation and consider a large write operation to be a secondary data access operation. Portions of the large write operation may be performed at different times. However, as noted earlier, read operations need not always be primary data access operations, and write operations need not always be secondary data access operations. Thus, in an alternate example, a large DSD internal read operation may serve as a secondary data access operation. Portions of the large read operation may be performed at different times. In general, any suitable large data assess operation may serve as a secondary data access operation, and any suitable data access operation may serve as a primary data access operation.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   calculating, by a data storage device processor, at least one access trajectory from a first disc surface location to at least one second disc surface location at which at least one primary data access operation is to be carried out;
   determining, by the data storage device processor, whether an opportunity to commence at least one secondary data access operation exists along or proximate to the at least one access trajectory from the first disc surface location to the at least one second disc surface location;
   in response to determining that the opportunity to commence the at least one secondary data access operation exists, commencing the at least one secondary data access operation; and
   determining how much of the secondary data access operation to complete based at least in part on one or more performance constraints on the primary data access operation or a group of data access operations including the primary data access operation.

2. The method of claim 1 and wherein:
   the at least one primary data access operation is a read operation or a write operation; and
   the at least one secondary data access operation is a read operation or a write operation.

3. The method of claim 1 and wherein the one or more performance constraints comprise a command completion time (CCT) constraint.

4. The method of claim 1 and further comprising, after commencing the at least one secondary data access operation, determining, based on one or more predetermined strategies, when to seek to either the at least one second disc surface location to perform the at least one primary data access operation or to a different disc surface location to perform a newly selected data access operation that is different from the at least one primary data access operation.

5. The method of claim 4 and wherein a decision to seek to either the at least one second disc surface location or the different disc surface location is made based on whether the at least one second disc surface location or the different disc surface location is at a shorter seek distance from a data storage disc track that is currently being accessed as part of the at least one secondary data access operation.

6. The method of claim 5 and further comprising completing at least a predetermined portion of the at least one secondary data access operation before carrying out the seek.

7. The method of claim 6 and further comprising selecting a seek speed that allows at least some latency for completion of more than the predetermined portion of the at least one secondary data access operation before commencing the seek.

8. The method of claim 1 and further comprising determining which one or more of a plurality of potential secondary data access operations qualifies as the at least one secondary data access operation based on a distribution of access times for the plurality of secondary data access operations.

9. A data storage device comprising:
   a data storage medium having at least one data storage surface;
   at least one head configured to interact with the at least one data storage surface to perform data access operations;
   a processor communicatively coupled to the at least one head, the processor configured to:
     compute at least one access trajectory for the at least one head from a first location of the at least one data storage surface to at least one second location of the at least one data storage surface at which at least one primary data access operation is to be carried out by the at least one head;
     determine whether an opportunity for the at least one head to commence at least one secondary data access operation exists along or proximate to the at least one access trajectory from the first disc surface location to the at least one second disc surface location;
     in response to determining that the opportunity to commence the at least one secondary data access operation exists, commence the at least one secondary data access operation; and
     determine how much of the secondary data access operation to complete based at least in part on one or more performance constraints on the primary data access operation or a group of data access operations including the primary data access operation.

10. The data storage device of claim 9 and wherein:
    the at least one primary data access operation is a read operation or a write operation; and
    the at least one secondary data access operation is a read operation or a write operation.

11. The data storage device of claim 9 and wherein the one or more performance constraints comprise a command completion time (CCT) constraint.

12. The data storage device of claim 9 and wherein the processor is further configured to, after commencing the at least one secondary data access operation, determine, based on one or more predetermined strategies, when to seek to either the at least one second disc surface location to perform the at least one primary data access operation or to a different disc surface location to perform a newly selected data access operation that is different from the at least one primary data access operation.

13. The data storage device of claim 12 and wherein the processor is further configured to decide to seek to either the at least one second disc surface location or the different disc surface location based on whether the at least one second disc surface location or the different disc surface location is at a shorter seek distance from a data storage disc track that is currently being accessed as part of the at least one secondary data access operation.

14. The data storage device of claim 13 and wherein the processor is further configured to complete at least a predetermined portion of the at least one secondary data access operation before carrying out the seek.

15. The data storage device of claim 14 and wherein the processor is further configured to select a seek speed that allows at least some latency for completion of more than the predetermined portion of the at least one secondary data access operation before commencing the seek.

16. The data storage device of claim 9 and wherein the processor is further configured to determine which one or more of a plurality of potential secondary data access operations qualifies as the at least one secondary data access operation based on a distribution of access times for the plurality of secondary data access operations.

17. A method comprising:
- classifying, by a controller of a data storage device, data access operations to be carried out in the data storage device into primary data access operations and secondary data operations based on one or more data operation characteristics;
- calculating, by the processor, at least one access trajectory from a first disc surface location to at least one second disc surface location at which at least one primary data access operation of the primary data access operations is to be carried out; and
- determining, by the processor, whether an opportunity to commence at least one secondary data access operation of the secondary data access operations exists along or proximate to the at least one access trajectory from the first disc surface location to the at least one second disc surface location
- in response to determining that the opportunity to commence the at least one secondary data access operation exists, commencing the at least one secondary data access operation; and
- determining how much of the secondary data access operation to complete based at least in part on one or more performance constraints on the at least one primary data access operation or a group of data access operations including the at least one primary data access operation.

18. The method of claim 17 and wherein the one or more data operation characteristics comprise a data access operation type.

19. The method of claim 17 and wherein the one or more performance constraints comprise a command completion time (CCT) constraint.

20. The method of claim 17 and further comprising determining which one or more of a plurality of potential secondary data access operations qualifies as the at least one secondary data access operation based on a distribution of access times for the plurality of secondary data access operations.

* * * * *